April 1, 1941.  A. BOYNTON  2,236,512

WELL TESTING TOOL

Filed Oct. 4, 1938  3 Sheets-Sheet 1

ALEXANDER BOYNTON,
INVENTOR,

Jesse R. Stone
Lester B. Clark
ATTORNEYS.

April 1, 1941.    A. BOYNTON    2,236,512
WELL TESTING TOOL
Filed Oct. 4, 1938    3 Sheets-Sheet 2

ALEXANDER BOYNTON,
INVENTOR
BY Jesse R. Stone
Lester B. Clark
ATTORNEYS.

April 1, 1941.　　　A. BOYNTON　　　2,236,512
WELL TESTING TOOL
Filed Oct. 4, 1938　　　3 Sheets-Sheet 3

ALEXANDER BOYNTON,
INVENTOR,
BY Jesse C. Stone
Lester D. Clark
ATTORNEYS.

Patented Apr. 1, 1941

2,236,512

UNITED STATES PATENT OFFICE 2,236,512

WELL TESTING TOOL

Alexander Boynton, San Antonio, Tex.

Application October 4, 1938, Serial No. 233,238

16 Claims. (Cl. 166—1)

My invention relates to well testing device in which a packer mounted upon the drill stem or other pipe is lowered to the top of, or slightly above the formation to be tested. The drill pipe is suspended, with the device attached to its hanging lower end. Mechanism is provided to keep the well fluid from entering the drill stem until the packer has been expanded against the adjacent formation, so as to prevent downward movement of well fluid from above the packer during the test. The packer is expanded by fluid pressure applied by a piston, which piston is in turn actuated by a cable. The movement which expands or sets the packer also serves to open the drill stem below the packer for entrance of well fluid. This operation, in effect, pumps the well dry down to the level of the packer. The quantity and nature of fluid the well produces into the drill stem while the packer is set, is a fair test of what the formation below the packer will produce if casing be set and the well completed. A single operation of releasing the cable pull, automatically releases the packer, and closes the liquid intake ports into the drill stem below the packer, after which the drill stem may be bailed, swabbed, or withdrawn from the well in order to ascertain the result of the test.

No shoulder, or so-called rat hole, is required to set this packer as it is a wall type packer which may be set anywhere in the well bore. Neither is it necessary that the drill stem extend to bottom of the well in expanding the packer. The position of the packer in the well is determined by the length of drill stem above the packer, and not by length of the usual anchor string below the packer, the latter string, omitted in the employment of this packer, being now generally employed to determine the position of most other wall packers.

The packer herein employed will not stick, lodge, or "freeze" in the well bore, as do the usual types of packers now used; because when the cable pull which causes the packer expansion is released, the pressure of well liquid automatically compresses the packer herein employed.

Some type of bit, usually a fish tail, is ordinarily, but not necessarily, attached to the lower end of the device to facilitate mixing mud in the well bore if necessary to do so, by rotating the drill stem or by pumping through it, either or both.

The drill stem may be pumped through at any time, as well as rotated, while the device is being run into or being withdrawn from the well.

No turning of the drill pipe is required to cause expansion of the packer, or opening or closing of the intake ports; such operation being wholly controlled by means of an attachable and detachable cable operated through the drill stem.

A clutch is provided proximately above the packer. This clutch is normally engaged, so that the entire drill stem and device may be rotated as a unit. The clutch is adapted to become disengaged by the same cable pull which causes expansion of the packer. After the packer has been expanded, the drill stem from the clutch upward may be rotated as in drilling, while the packer and all parts upon which it is mounted remain stationary during the test. Sticking of the drill stem in the well is prevented.

The device also provides for the employment of means for recording pressures, temperatures, etc. obtaining in the well.

The main objects of this invention are to provide a formation testing device for drilled wells, which device has the following advantages:

First: That it may be safely run into, and readily withdrawn from a well for the purpose of recovering a measured sample of the well's production from the horizon below where the packer is set, whether the well be cased or uncased; and which device may be also used to discover, locate, and measure leaks coming in or going out through any casing which may be in the well and close openings with cement.

Second: That it operates in a straight bore, and does not require that an offset or shoulder be provided by drilling a hole of reduced diameter into or through the formation to be tested.

Third: That the pipe upon which the device is run may be rotated from top to bottom, including the device itself, while it is being lowered into, or being withdrawn from the well, and which may be pumped through during any or all such times.

Fourth: That the pipe may be rotated above the packer during the production test, while the packer remains stationary.

Fifth: That, by the action of a piston having suitable effective area, the packer may be set with any necessary force.

Sixth: That, by wholly withdrawing the internal pressure employed to expand the packer, the packer is released and then caused to be contracted by external pressure of the well fluid, which pressure also causes the intake ports to close and urges all other parts toward their normal positions.

Seventh: That the device may be placed anywhere in a well bore by merely raising or lowering the drill stem upon which it is run; and that by swabbing or bailing the test fluid out of the drill stem after each test, additional tests may be made in rapid succession either of the same or different formations by merely raising or lowering the drill stem, so as to place the packer in proper position for each test.

Eighth: That pressure and temperature recording instruments, and other instruments if desired, may be placed in the device for the purpose of ascertaining the pressure and temperature and variations thereof, obtaining during the test in the formation.

Ninth: That, by a test or series of tests, which may be rapidly conducted at moderate cost with this device, all information relative to the production of a well is quickly available, thereby rendering it unnecessary to take cores of the formation in drilling for oil, gas, water, or other mineral.

With the foregoing and other related objects in view, reference is now made to the drawings, in which—

The same reference characters are employed to refer to the same parts throughout the several views.

Figure 1:
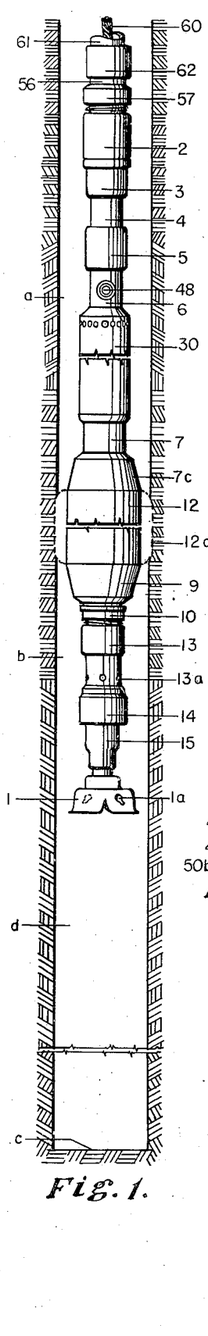
Fig. 1 is a side elevation of the preferred form of the invention shown in a well bore, the expanded position of the packer being illustrated by dotted lines.

In Fig. 1, the preferred form of the invention is shown inserted in a well bore $a$, with the bit 1 suspended in the well, the packer 12 being positioned proximately above the formation $b$ being tested; other lower formations being indicated at $d$. The dotted lines 12c indicate the packer expanded into sealing off engagement with the well formation having been actuated by means of a cable 60 attached to pull rod 55, means being provided to attach and detach the cable from the pull bar when necessary to expand or contract the packer, as required. The overshot or grappling tool for attaching and detaching the cable from the pull bar is not shown, because many tools for such purposes are old and well known in the art. That part of the well bore between the bit 1 and bottom of the well $c$, indicated at $d$, is intended to show that the device may be positioned anywhere in a well bore, that no anchor string is required to support the packer from bottom of the well, and that successive tests may be made.

Figure 2:
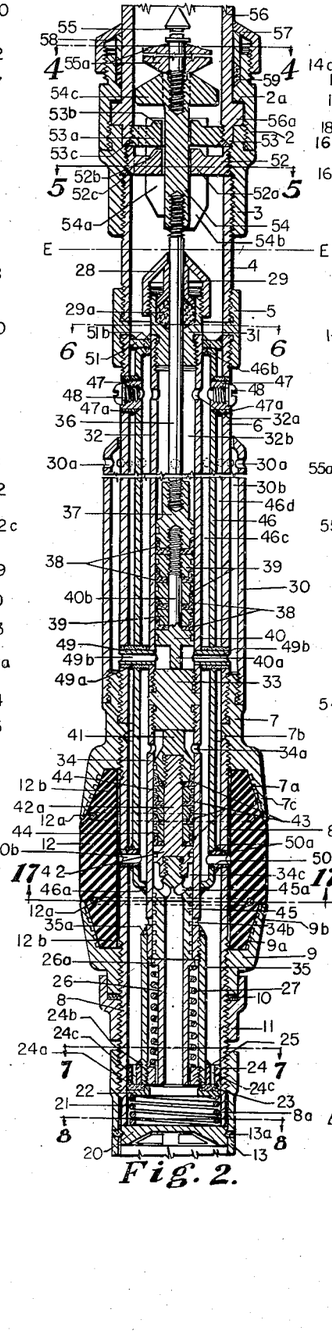
Fig. 2 is a longitudinal section of the upper portion of the device outlined in Fig. 1.
Figure 3:
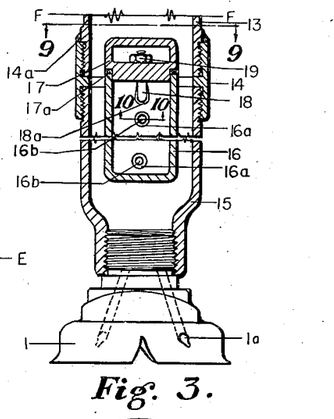
Fig. 3 is a longitudinal section of the lower portion, completing the device partially shown in Fig. 2.
Figure 4:
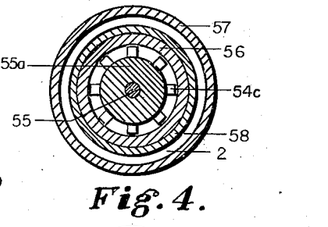
Fig. 4 is a transverse section on the line 4—4, Fig. 2.

The outer shell of the device, having its members joined together as shown in Figs. 2 and 3, consists of the upper clutch shell housing nipple 2, the lower clutch shell housing nipple 3, the nipple 4, coupling 5, nipple 6, the packer end shield member 7, the packer nipple 8, the nipple 13, coupling 14 which is welded to nipple 13 at 14a and the instrument case housing nipple 15, and the bit 1.

The packer 12 is employed to seal off against the wall of the well bore so as to prevent downward migration of well fluid from above during the test. The packing may be of rubber or any other tough, durable, and expansible substance, loosely surrounding the nipple 8, with its tapered ends 12b closely engaged within the cups or shields 7c and 9b. The packer end shield member 9, threadedly engaged over nipple 8, affords means for causing the packer to be adjustably engaged between its end shields. The locking ring 11 and packing 10 are obvious means for preventing leakage under high pressures along the threads between members 8 and 9. The weld 7b prevents such leakage between the members 7 and 8. The grooves 7a and 9a provide that the tapered ends of the packer will imbed therein and securely engage the internally grooved surfaces of the packer and shield members whenever great expansive force is exerted within the packer.

The steel reinforcing rings 12a, which preferably may be moulded into the packer, are shown properly positioned proximate the ends of cupped portions 7c and 9b of the members 7 and 9, respectively. The tapered ends of the packer may be each six to eight inches long. The distance between the reinforcing rings may be twelve to eighteen inches. The packer wall should be, preferably, not less than twice as thick as the clearance between the packer and the wall of the well, and may preferably be much thicker if diameters will permit. The clearance between the packer and well bore may vary with different tools and different wells. It will be understood that the above dimensions are by way of illustration only, and that the device will be made for different sizes and conditions in well bores. The packer is expanded by liquid pumped by the upward stroke of a piston into the annular chamber 46c, whence this liquid contacts the inner wall of the packer through openings 50b.

Figure 6:
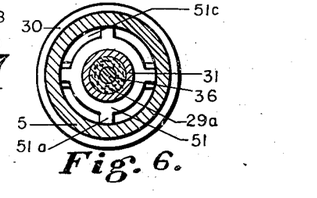
Fig. 6 is a transverse section on the line 6—6, Fig. 2.

The inner cylinders, one above the other, and both axially positioned within the device, are disposed to house two pistons, one employed to expand the packer, and the other to control the admission of test fluid. These cylinders are formed of nipples 32 and 34, threadedly joined upon the partition plug 33, the spring housing nipple 35 being secured upon the lower end of lower cylinder 34 by threads and the weld 35a. The cylinder assembly is supported at its upper end by a support spider 51, having welds 51b, Fig. 2, by which the spider is secured upon the upper cylinder 32 and its arms 51a, Fig. 6, secured within nipple 6.

The check valve support 24, secured within the packer nipple 8 by the weld 24a, and secured upon the spring housing nipple 35 by a weld 24b, serves to fasten the lower end of the cylinder assembly. Both ends of this assembly are strongly secured as shown, in order that the cylinders will not be lifted out of place by the strong cable pull upon the piston within cylinder 32 when the packer is expanded. The welds 46b and 46a, which join the upper and lower crimped ends of the pressure pipe 46 to the cylinder assembly, and welds 49a, which join the nipple 6 and the cylinder 32 together, provide further anchorage for this assembly.

Within the cylinder 32, the upper piston assembly has a close sliding fit. The purpose of this piston is to expand the packer by forcing liquid into it as will be explained. The upper piston assembly is formed of piston base 40, having a landing leg 40a and a cup carrier extension 40b, over which extension cups 38 are held apart by the spacers 39. The threaded engagement between extension 40b and the piston head 37 secures the assembly which will be referred to as the piston 37—40. The piston rod 36, having threaded engagement with head 37, has a close sliding fit through cylinder head plug 31 within the upper end of which the packing 29a engaged by the gland 29 is held tightly around this rod by a stuffing box cap 28.

The pressure pipe 46, secured upon the cylinder assembly by welds 46a and 46b, as stated, has within it the annular chamber 46c. This chamber communicates with the chamber 32b through openings 32a and with the inner wall of the packer through openings 50b. Short nipples 50, secured between the nipple 8 and the pressure pipe 46 by the welds 50a and weld 46b, which latter weld joins together pipe 46 and cylinder 32 proximate their upper ends, make the chamber 46c secure against leakage therefrom when great pressure is exerted on any liquid therein by the piston 37—40.

It will be noted that the short nipples 49, secured between the nipple 6 and the cylinder 32 by the welds 49a, have openings 49b communicating between the annular space around leg 40a of piston base 40 and the annular lubrication chamber 30b, which chamber is in communication with the well bore through the openings 30a. It is, therefore, apparent that the pressure of well liquid in the well bore is exerted under the piston 37—40. This force, of course, is equalized by the same pressure exerted exteriorly of the packer, and is transmitted through the elastic wall of the packing to the chamber 32b above the piston via openings 50b, chamber 46c, and ports 32a.

The piston 37—40, having the well pressure equalized above and below it, will transmit the entire force of a cable pull upon it to a liquid contacting the interior of the packer, as is obvious. For this purpose the chambers 32b and 46c are filled with a liquid, preferably a viscous lubricant such as lead paint, glycerin or heavy oil. The liquid employed to transmit the force exerted upon piston 37—40 to the packer may be placed in the chambers 32b and 46c through the openings shown closed by plugs 48, the short nipples 47 secured between nipple 6 and pipe 46 by welds 47a, being to close off all communication between annular chambers 46c and annular opening 46d.

The annular chamber 30b formed within the crimped sleeve 30 may be also filled with a lubricant which should be of a specific gravity heavier than the well liquid, lead paint being satisfactory. When the piston 37—40 is raised by a cable pull, as will be explained, the lubricant placed in chamber 30b will be drawn under the piston; and when the piston returns, this lubricant will be forced back into the chamber 30b. In this manner, mud in the well bore is kept from under the piston and proper lubrication provided for its easy return.

The breather passages 30a are for the obvious purpose of allowing well fluid to come and go through them as the lubricant level in chamber 30b rises and falls in response to the movements of the piston. It will be noted that the leg 40a is long enough to prevent the piston 40 from traveling far enough downward to close the openings 49b, also that the upper end of piston head 37 is of reduced diameter for sufficient length to provide that the piston, in its uppermost position, will not close the ports 32a.

The diameter of piston 37—40 will ordinarily vary between 1¾ and 2¾ inches, depending, of course, upon the size of well bore for which the tool is dimensioned. Obviously, the piston stroke used to expand the packer will vary with the diameter of the piston, the inside diameter, and length of the packer, and the clearance between the packer and well bore. A piston travel of four to eight feet will allow the tool to be of convenient length, and that the piston will be of small enough diameter to develop more power than necessary to expand the packer by the pull of an ordinary swab or bailing line such as may be on hand with all well equipped drilling rigs.

Within the cylinder 34, another piston has a close sliding fit. The purpose of this lower piston is to control the admission of sample fluid into the drill stem, as will be explained. While the piston base 42 and the piston 45 are shown connected, it will be understood that these pistons need not be connected. The piston base 42 has cups 43 and cup spacers 44 fitted over its upper extension which is of a reduced diameter 42a. The piston spacer head 41, having threaded engagement upon the extension 42a, serves to secure the cups and spacers in position, as shown.

The lower tubular extension of the piston base 42 is arranged to receive the intake valve piston 45 whose upper end is of reduced diameter. This piston member has a close sliding fit within the cylinder 34. A central opening through the piston member 45 communicates with openings 45a leading into the annular chamber 34c. The lower piston assembly, including the members 41 and 45, will be referred to as piston 41—45. This double piston is urged to its normal upper position as shown in Fig. 2, by the force of coiled spring 27 engaging under the externally flanged upper end 26a of valve travel spacer 26. The spring is supported, and may have its compression adjusted, by the base ring 25, threadedly engaged within the lower end of spring housing nipple 35. The lower end of valve travel spacer 26 is spaced from the valve landing spider 20 by the lower extension 8a of nipple 8, so that when the spacer 26 lands upon the spider, the annular space 34c will have moved to opposite the discharge ports 34b (see Fig. 19). It will be observed in Fig. 2 that in the upper or normal position of the piston member 45, it closes the ports 34b. The piston spacer head 41 has an upper portion of reduced diameter which lands upon partition plug 33, so as to provide that pressure ports 34a will never be closed by the piston.

Figure 5:
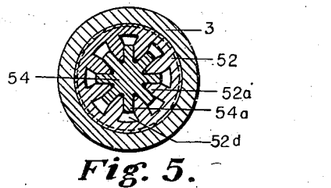
Fig. 5 is a transverse section on the line 5—5, Fig. 2.

The check valve assembly provides that the drill stem may be pumped through at any time, but prevents well liquid from ever entering the drill stem through the openings 24c. This assembly consists of valve washer 23, which may be of leather, rubber, belting, or any other tough, pliable substance; the check valve base 22, and the coiled spring 21, the latter being supported by the valve landing spider 20 secured within the nipple 13 by welds 13a. It will be observed that valve washer 23, for approximately one half of its thickness, is set into a conforming recess within the upper end of its base 22, so as to partially house the valve member, and thus positively cause it to engage over the openings 24c. This check valve, normally closed by the expansive force of the spring 21, plus pressure of the well fluid, obviously, will yield to a sufficient unseating pressure from within the drill stem. If the device be pumped through, the pump fluid takes a downward path through the openings 52d of the clutch (see Fig. 5) the annular opening 46d, the opening 24c, Figs. 2 and 7, after forcing the valve member 23 off its seat; and through spider 20 (see Fig. 8), thence passing around instrument case 16, Fig. 3; and out of the bit through openings 1a.

A simple form of clutch is shown proximate the upper end of Fig. 2. This clutch, shown engaged, provides means whereby the drill stem and packer may be rotated as a unit while the device is being lowered into or being withdrawn from a well. The wings 54c are freely slidable within the drill stem connection member 56, and are provided for the evident purpose of holding the pull rod 55 central therein so that it may be easily engaged and disengaged by the cable overshot or other means employed to engage and disengage the cable therewith. Due to disengagement of the clutch caused by the pull of the cable attached to pull rod 55, the drill stem may be rotated during the test, while the packer will remain stationary. The drill stem connection member 56 has an external flange 56a, rotatively engaged between the internal flange 2a and the upper end of member 3. A series of equally spaced female keys 53a, Fig. 12, having upper wedge shaped ends 53b, are formed interiorly of the upper clutch female member 53, which member is threaded into the lower end of member 56 and secured there by the weld 53c. The lower female member 52, threaded into member 3 and secured there by the weld 52c, has an equal number of equally spaced similar female keys 52a, with wedge shaped upper ends 52b, similar to the wedge shaped upper ends 53b of the member 53.

The members 52 and 53 are shown as made separate from the respective parts into which they are secured for manufacturing convenience only. The male member 54, Fig. 11, of this clutch also has an equal number of similarly equally spaced keys 54a, having similar wedge shaped lower ends, which keys have an easy sliding fit between the female keys 52a and 53a. The engagement between the male and female members of this clutch will lock the members 3 and 56 together against independent rotation, as shown in Fig. 2. When a cable is attached to pull the rod 55 the cable is pulled upon with sufficient force, the male member of the clutch will be raised out of the female members, thus disengaging the clutch; whereupon the drill stem may be rotated independent of the packer. The upper female clutch member 53 rotates with the drill stem while the lower female clutch member 52 and all parts below it remain stationary.

When the cable pull upon pull rod 55 has been released, the clutch will reengage because the pressure of well fluid exterior of the packer will force the piston 37—40 down to its normal position, shown in Fig. 2. The weight 55a, Fig. 2, may be employed, if necessary, to overcome friction and resistance of heavy mud in completing the return or reengaging movement of the clutch. This weight, shown broken, may be of any length necessary to provide the required weight, which, when employed at all, may be, for example, 1,000 to 2,000 pounds. Manifestly, a coiled spring engaged between the member 56 and the wings 54c may be substituted for said weight.

Figures 7, 8, 9, 10, 11, 12, 13:
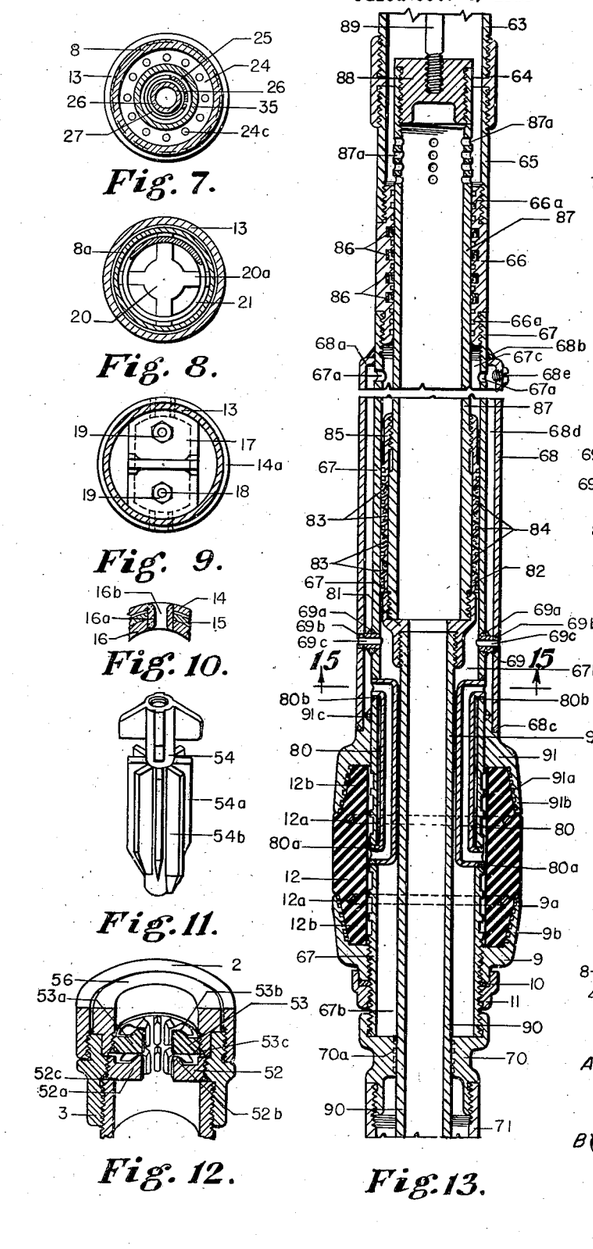
Fig. 7 is a transverse section on the line 7—7, Fig. 2.
Fig. 8 is a transverse section on the line 8—8, Fig. 2.
Fig. 9 is a transverse section on the line 9—9, Fig. 3.
Fig. 10 is a transverse section on the line 10—10, Fig. 3.
Fig. 11 is an outside view in perspective of the clutch of Fig. 2.
Fig. 12 is a longitudinal section in perspective, showing a portion of the clutch mechanism illustrated proximate the upper end of Fig. 2.
Fig. 13 is a longitudinal section of a portion of the first modified form of the invention.

It will be noted that the male member of the clutch has one key 54b longer than the others. This longest key, also having a wedge shaped lower end, acts as a pilot to guide all of the other male keys into proper engagement with their mating female members. In this operation an opening between the inclined wedge shaped upper ends 53b, of the upper female members is engaged by this longest male key, and, in turn, an opening between the similar upper ends 52b of the lower female member is engaged by the lower wedge shaped end of this longest male key 54b by which both female members are readily aligned to have all their other slots engaged by the other shorter keys of the male member.

The packing 59, within an annular recess between members 2 and 56, is engaged by the gland 58, which gland is caused to securely engage the packing by means of stuffing box cap 57. The evident purpose of this packing is to prevent leakage through the clutch.

An instrument case 16, Fig. 3, may be welded into the nipple 15 by welds 16a, which have control openings 16b which communicate between the interior of the instrument case and the well bore. The lid 17, by which the instruments may be placed into or removed from the case, is secured upon the packing 17a by nuts 19 engaging upon studs 18, secured within case 16 by welds 18a. All outside communication with the interior of the instrument case will be through openings 16b. Within this case, suitable instruments may be placed for the purpose of recording pressures and temperatures and variations therein while the device is being lowered into the well, while the sample is being taken and while the device is being withdrawn from the well. Suitable records can be kept to ascertain the relative position in the well during various readings or recordings depending, of course, upon the type of information which is being obtained.

In operation, the device is secured upon the drill stem 61, Fig. 1, by means of a coupling 62, threaded upon the upper end of drill stem connection member 56, and lowered into the well bore until the packer is at a point opposite, or slightly above, the formation to be tested, this formation being indicated at b, Fig. 1.

Obviously, all formations below the packer will be on test. If, however, it is desired to separately test any particular formation, to the exclusion of all other formations, it will be necessary to conduct two tests. The first test should be made by setting the packer immediately above the formation to be tested. In the second test, the packer should be set immediately below this formation. The difference between the two tests will disclose the quantity and character of fluid entering the well bore through the formation between the levels where the packer was set for both tests. To illustrate, it will be assumed that the well is four thousand feet deep, and that there is a sand to be tested from 3,000 to 3,020 feet, it being also assumed that there are numerous other sands which may be discharging into the well bore below three thousand feet. In order to test the sand between 3,000 and 3,020 feet, the packer should be set at or slightly above 3,000 feet for the first test, and again set at 3,020 feet, or slightly below, for the second test. If the first test should reveal that all formations below 3,000 feet are producing at the rate of 1,000 barrels per day, and if the second test should show that all formations below 3,020 feet are producing at the rate of 500 barrels per day, it becomes evident that the sand between 3,000 and 3,020 feet is producing the other 500 barrels per day.

The device being lowered into proper position for the test, as above stated, a cable, having some form of overshot or other means to engage with pull rod 55, is lowered into the drill stem until such engagement is made. The cable is then pulled upon with enough force to raise the piston 37—40 far enough to expand the packer into sealing off engagement with the wall of the well bore. As heretofore stated, the pressure of the well fluid above the packer is transmitted under this piston through breather passages 30a, chamber 30b, and openings 49b. The full force of the cable pull upon the piston, therefore, is transmitted by liquid pumped out of chamber 32b, through pressure ports 32a, chamber 46c, and openings 50b, to the interior of packer 12.

Figures 18, 19, 20, 21, 22:
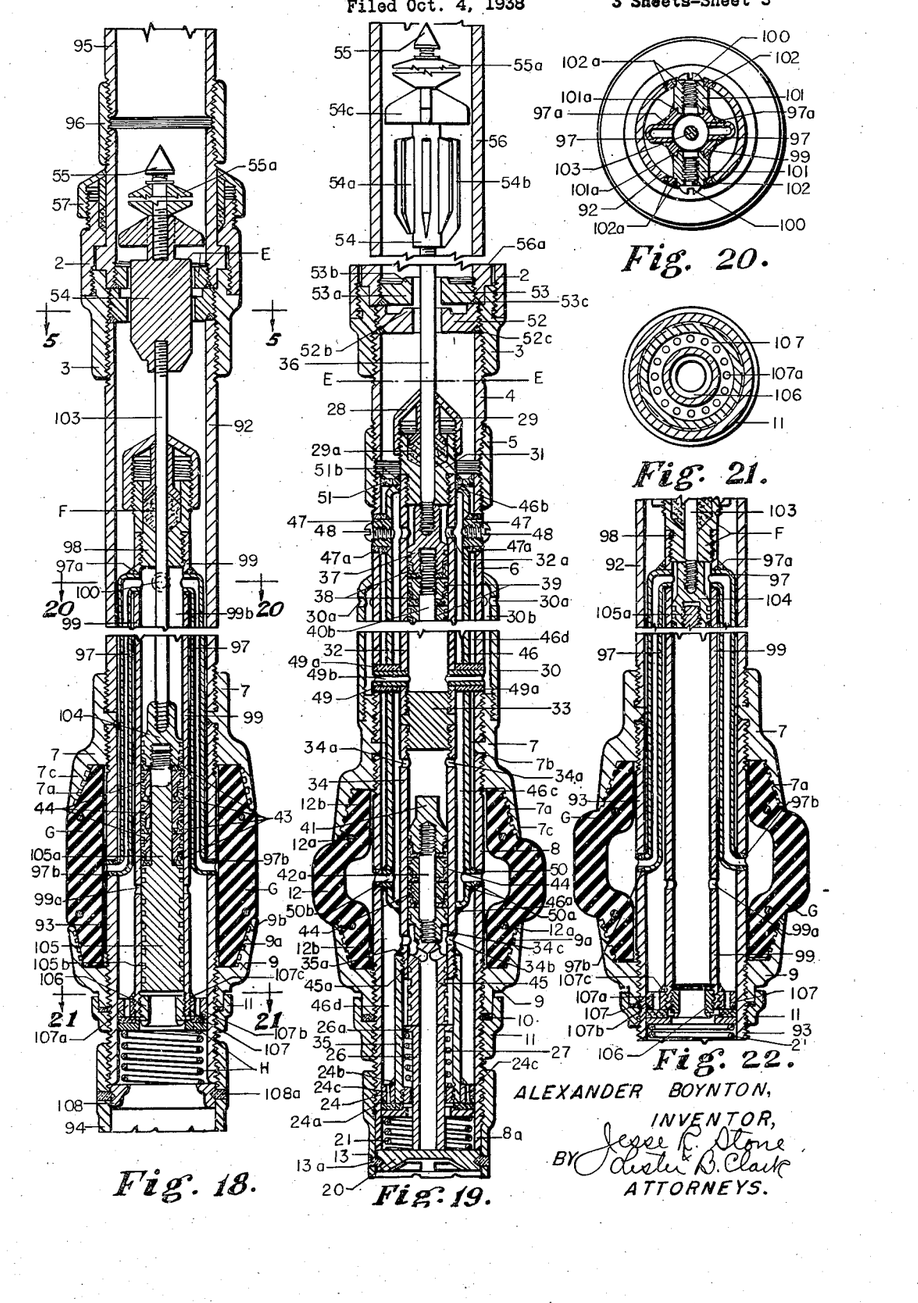
Fig. 18 is a longitudinal section of a portion of the second modified form of the invention.
Fig. 19 is a longitudinal section of the portion of the device illustrated in Fig. 2, showing the relative position of the parts with the packer expanded.
Fig. 20 is a transverse section on the line 20—20, Fig. 18.
Fig. 21 is a transverse section on the line 21—21, Fig. 18.
Fig. 22 is a longitudinal section of a portion of the portion of the device illustrated in Fig. 18, showing the relative position of the parts with the packer expanded.

The packer being expanded so as to securely hold all well fluid in the well bore above it, the intake ports 34b must be placed in communication with the well fluid below the packer to allow this fluid to enter the drill stem. The intake ports are opened by the same pressure means employed to expand the packer. It will be observed that pressure ports 34a (see Fig. 19), communicate with the annular chamber 46c into which chamber the fluid in the chamber 32b is pumped by the cable pull. Some of the fluid so pumped enters through ports 34a and forces the piston 41—45 downward, compressing spring 27. The downward movement of this piston is arrested by the landing of valve travel spacer 26 upon the landing spider 20, at which time the annular chamber 34c has moved downward opposite the intake ports 34b, as shown in Fig. 19. Well fluid from below the packer then enters the drill stem via openings 1a of the bit, passing around the instrument case in nipple 15, passing between arms 20a of spider 20 (see Fig. 8), through the central opening in spacer 26 and a similar opening through piston 45, through ports 45a, through chamber 34c, and intake ports 34b (see Fig. 19), into annular opening 46d, and thence through openings 51c of spider 51 (see Fig. 6), and openings 52d of the clutch (see Fig. 5).

The spring 27 should be adjusted to hold the intake valve piston 45 in closed position over the intake ports 34b until the packer has been fully expanded, and all well fluid above it sealed there against downward movement past the packer. Such adjustment, obviously, will provide that no well fluid can enter the drill stem except from the well bore below the packer, indicated at b and d, Fig. 1. If it be assumed that 200 pounds per square inch in chamber 32b will cause the packer to securely engage the formation, then, if the spring 27 be adjusted to allow intake ports 34b to be uncovered by 300 pounds per square inch of pressure applied by piston 41—45 through ports 34a, and if the cable pull is such as to cause the piston to transmit 500 pounds per square inch to chamber 32b, it is apparent that the test will allow only well fluid from below the packer to enter the drill stem. A half-inch steel cable, such as are frequently employed for bailing or swabbing wells will withstand more than 18,000 pounds pull. If, for example, the piston employed to pump fluid into the packer, has an end area of 3 square inches and that 15,000 pounds is pulled on the cable attached to the piston, the packer will be expanded by a pressure of 5,000 pounds per square inch.

At conclusion of the test, the cable pull should be quickly released in order to allow the spring 27 to promptly return the piston 41—45, thereby closing the intake ports 34b.

When the cable pull is released, all parts of the device will be instantly returned to the positions shown in Fig. 2. Such return is accomplished by the well pressure transmitted through the distended packer upon the fluid within it, causing this fluid to recede into the chamber 32b via openings 50b, chamber 46c, and ports 32a, a weight 55a being employed to make this action more positive if friction or heavy mud should impede the return of all parts to their normal positions.

In the first modified form of the invention in Fig. 13 the parts are the same as already described, and it will be understood that a clutch such as shown in Fig. 2 and an instrument case, such as shown in Fig. 3, may be employed with, and as completing, the device illustrated in Figs. 13 and 14, which will be considered as inserted or fitted into the showing in Fig. 2 at the line E—E, with the construction shown in Fig. 3 attached below. That is, the part of the device shown above the line E—E in Fig. 2 will be considered as being joined upon the top of the device illustrated in Fig. 13; and that part of the device shown in Fig. 3 will be considered as being joined upon the lower end of the showing in Fig. 14.

Figure 14:
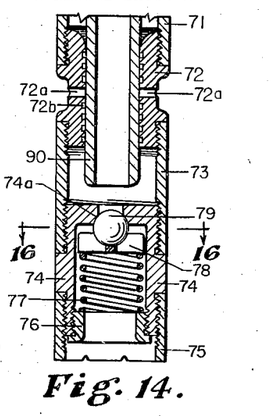
Fig. 14 is a longitudinal section of the lower portion continuing the device shown partially in Fig. 13.
Figure 15:
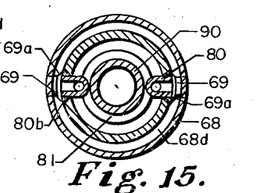
Fig. 15 is a transverse section on the line 15—15, Fig. 13.
Figure 16:
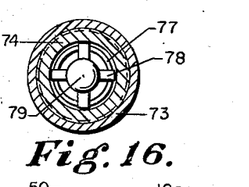
Fig. 16 is a transverse section on the line 16—16, Fig. 14.
Figure 17:
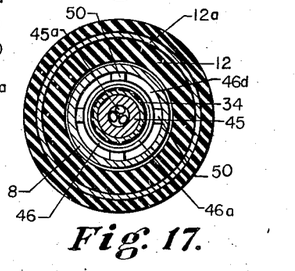
Fig. 17 is a transverse section on the line 17—17, Fig. 2.

The outer shell of the modification illustrated in Figs. 13 and 14 is formed of the nipple 63, corresponding to the nipple 4 in Fig. 2; the coupling 64, nipple 65, sleeve nipple 66, having internal annular grooves 66a, while the packer nipple 67, has the pressure chamber nipple 68 superimposed upon it. The sleeve connection member 70 has internal annular grooves 70a and the nipple 71 and sleeve member 72, have internal annular grooves 72b. The nipple 73, check valve housing member 74, and nipple 75, are connected in turn below the member 70.

The inner string, Figs. 13 and 14, is formed of piston carrier nipple 87, connection member 81, and intake valve nipple 90.

In Fig. 13 a packer 12 is loosely fitted over nipple 67 and has rings 12a and tapered ends 12b, the same as the packer in Fig. 2. The end shield member 91 secured upon nipple 67 by weld 91c and having internal annular grooves 91a in its cupped extremity 91b, corresponds in use and purpose to the similar part 7 in Fig. 2. The end shield member 9, having internal annular grooves 9a in its cupped portion 9b; also packing 10 and locking ring 11 are the same in construction and purpose as the similar parts bearing corresponding reference characters in Fig. 2. The packer assembly in Fig. 13 will be understood as serving the same purpose as the packer employed and described in connection with Fig. 2, to which reference is here made.

A piston actuated by pulling on a cable and adapted to expand the packer by pumping fluid into it, is employed similarly to the somewhat different piston shown in Fig. 2. The piston base ring 82, Fig. 13, pressed over nipple 87, and engaging upon connection member 81; packing rings 83, and packing ring spacers 84, also engaged over the same nipple, are secured in the assembled position as shown by the piston assembling clamp 85, having threaded engagement upon the nipple 87. This piston has a close movable fit within nipple 67 and will be designated by the reference numerals 82—85.

The annular chamber 68d, Fig. 13, formed between nipples 67 and 68, is made leakproof by weld 68b securing the crimped upper end 68a upon nipple 67 and by weld 68c securing the lower end of nipple 68 upon packer end shield member 91. The pressure pipes 80, having their bent ends secured through nipple 67 by welds 80a and 80b provide leakproof communication between chamber 68d and the interior of the packer, as appears in Fig. 13. The piston carrier nipple 87 has a close sliding fit through a sleeve nipple 66 and circular the U-shaped cups 86 in order to prevent the liquid in chamber 67c from escaping therefrom except through the ports 67a when the piston is pulled upward. It will be understood that the chambers 67c and 68d are to be filled with a viscous liquid, such as lead paint, glycerin, or heavy oil, which may be supplied through the opening shown closed by plug 68e. The transverse break in the drawing, Fig. 13, slightly below the ports 67a indicates that considerable length is broken out.

The short nipples 69 secured to nipples 67 and 68 by welds 69a and 69b provide passages 69c communicating between the well bore and chamber 67b for the purpose of admitting well fluid into this chamber in order that the pressure under the piston will be equal to the well pressure exterior of the packer. It will be observed that there is no communication between the chambers 68d and 67b.

In making a test the drill stem, of course, will be run empty into the well, as in the preferred form. Well fluid is excluded from the drill stem by the ball check valve 79 engaging upon its seat 74a thereby closing the central opening through the upper end of member 74 against well fluid from below. This valve is supported upon winged member 78 by the spring 77 resting upon its base ring 76, as appears in Fig. 14. Except when test fluid is entering the drill stem, it will be noted that the intake ports 72a are closed by a nipple 90 which has a close sliding fit within the sleeve member 72, having annular grooves 72b, for the purpose of entrapping mud rings. The nipple 90 has also a close sliding fit through the sleeve member 70, having internal annular grooves 70a; the purpose of this fit being to prevent well fluid entering the chamber 67b through openings 69c from entering the drill stem through the lower end of nipple 90 when the lower end of this nipple is above the sleeve member 72 during the intaking period.

The lower end of the intake valve nipple 90 will be raised above the intake ports 72a by the upward movement of piston 82—85 when the packer is expanded as will be explained. When these intake ports are so uncovered, test fluid from below the packer enters through them and passes into the drill stem through openings 87a, Fig. 13, as is apparent.

The drill stem may be pumped through at any time, check valve 79 then yielding to allow pump fluid to pass out through the openings 1a of the bit, as appears in Fig. 3.

In operation for making a test, the device is lowered into the well and operated the same as was explained for the preferred form of the invention, the piston rod 89, Fig. 13, threadedly attached to member 88 serving the same purpose as stated for the rod 36, shown in Fig. 2.

Considering the device partially shown in Figs. 13 and 14, as being completed by adding the clutch and other parts above the line E—E, Fig. 2, to the upper end of the parts shown in Fig. 13 and by adding all parts in Fig. 3 below those shown in Fig. 14, the operation will be made clear by comparing Figs. 13 and 22, the former showing the packer unexpanded, and the latter showing a similar packer expanded.

The packer being placed in proper position for a test, as described for the preferred embodiment, a cable is attached to the pull rod 55. The cable is then pulled upon with enough force to expand the packer. In this operation piston 82—85 is raised and pumps the fluid in chamber 67c out through pressure ports 67a, into annular chamber 68d, and into pressure pipes 80, which pipes discharge upon the inner surface of the packer (see Fig. 22).

The operation of the first modified form, being similar to that of the preferred embodiment, reference is here made thereto.

Upon the lower end of Fig. 18, which figure illustrates the second modified form of the invention, the parts shown in Fig. 3 will be considered as added to complete the device.

It will be noted that in both preceding forms, the pressure under the piston employed to expand the packer was equalized with the well pressure above the packer, whereas in this form the pressure under the piston is equalized with the well pressure below the packer. The pressures immediately above and below the packer will be approximately the same while the packer is unexpanded, but after the packer is expanded, these pressures may vary greatly, and, in fact, will almost always so vary. This is true because the pressure above the packer is undisturbed and static; whereas, the pressure below the packer will be relieved as soon as the packer is set and the intake ports to the drill stem are opened. Obviously, if no fluid is produced by the well formation below the packer, only very slight flow, or possibly no flow into the drill stem will take place. Even great production from the formation below the packer will not maintain the pressure below the packer at anywhere near the pressure above it. For that reason, it is evident that, if the pressure under the piston be taken from below the packer, greater force must be exerted upon the cable to lift the piston than if this force be taken from above the packer. In the second modified form, fewer parts and somewhat simpler construction are employed to accomplish expansion of the packer than in either of the preceding forms, but at the expense of somewhat more force required to be exerted upon the cable.

The outer shell in Fig. 18 consists of a drill stem connection member 95, coupling 96, stuffing box cap 87, clutch shell members 2 and 3, nipple 92, packer end shield member 7, packer nipple 93, and nipple 94.

The inner shell in this construction is the one cylinder nipple 99, having intake ports 99a proximate its lower end.

The packer, indicated generally at G, is the same as the packer employed in both preceding forms and it is mounted the same as the packer in Fig. 2, except that the packer nipple 93, Fig. 18, is slightly different at its lower extremity from nipple 8, Fig. 2.

The means for expanding the packer consists of a cylinder, having a piston adapted to be actuated by a cable for the purpose of pumping liquid into the packer, pipes being provided to transmit the liquid from the piston chamber to the packer. The piston 105, having peripheral grooves 105b, has an upper extension of reduced diameter 105a over which are mounted cups 43 separated by spacers 44, being like and having the same reference numerals as the similar parts shown upon the lower piston in Fig. 2. The piston head 104, having threaded engagement upon the extension 105a, secures the piston assembly which will be referred to as piston 104—105. The lower position of this piston is determined by its engagement upon landing ring 106. The extreme upper position of the piston is determined by the engagement of piston head 104 upon the lower extremity of cylinder head plug 98 (see Fig. 22). The upper end of piston head 104 is of reduced diameter for sufficient length that it will act as an upper spacer to prevent the piston in its extreme upper position from closing the pressure pipes 97. The piston rod 103, clutch male member 54, and pull rod 55 provide means whereby an attachable and detachable cable 68, Fig. 1, may be employed to manipulate the packer, as explained for the preceding embodiments. The pressure pipes 97, secured upon cylinder 99 by welds 97a and secured upon nipple 93 by welds 97b, provide leak proof communication between the piston chamber 99b and the inner surface of the packer.

It will be understood that the chamber 99b is to be filled with a liquid, such as lead paint, glycerin, or heavy oil, as stated for the similar chamber 32b, Fig. 2. This chamber may be filled or drained through the opening shown closed by plugs 100, Fig. 20. It is necessary that there be no communication between the chamber 99b and the annular space between cylinder 99 and nipple 92. No such communication is possible through the openings closed by plugs 100 (see Fig. 20) and no leakage will occur on account of nipples 101 being secured upon cylinder 99 by welds 101a and rings 102 being secured upon nipple 92 by welds 102a.

It will be noted that pressure of well liquid below the packer transmits to the lower end of piston member 105 via openings 1a of the bit, Fig. 3. This pressure aids the cable pull in overcoming the pressure exterior of the packer, as is apparent, but since the pressure below the packer is subject to great reduction after the packer is expanded, more force will be required to raise the piston 104—105 than will be required to raise the pistons employed to expand the packer in either of the preceding forms, as has been explained.

At all times when the packer is not expanded, the check valve assembly indicated generally at H, Fig. 18, will exclude well fluid from the drill stem. The check valve support 107 is secured upon nipple 93 by weld 107b and upon cylinder 99 by weld 107c. These welds and the welded connections 97a and 97b joining pipes 97 to cylinder 99 and nipple 93, also serve to secure this cylinder against being torn out of its place by the cable pull employed to expand the packer. The spring base 108 secured within nipple 94 by welds 108a supports the spring and check valve assembly in the same manner as the part 20 supports the similar check valve in Fig. 2, hence the general reference here.

The clutch, referred to generally at E, Fig. 18, and the stuffing box, referred to generally at F, are like and serve the same purposes as the similar constructions in Fig. 2, the same being repeated in Fig. 18 to avoid the possibility of confusion often resulting from numerous breaks and resulting explanations.

The drill stem may be pumped through at any time, pump pressure unseating the check valve by contacting it through openings 107a and passing thence out of the bit through openings 1a, Fig. 3.

The instrument case and its purpose was explained in connection with the preferred form to which reference is made for its use in this modification.

The packer being properly positioned for a test, as heretofore explained, a cable is attached to the pull rod 55, Fig. 2, and pulled upon to raise piston 104—105 (see Fig. 22). The liquid in chamber 99b is thereby forced out through pipes 97 to engage the interior of the packer which is thereby expanded, as has been explained.

The break in the drawing, Fig. 18, indicates that the cylinder 99 and pressure pipes 97 may be of any desired length necessary to provide sufficient liquid in chamber 99b to properly expand the packer.

Raising the piston to expand the packer uncovers intake ports 99a, Fig. 22, thereby admitting test fluid into the drill stem from below the packer via openings 1a of the bit.

When the cable pull is released at conclusion of the test the pressure of well fluid compresses the packer and forces the fluid interior of the packer back through pipes 97 and into chamber 99b. This restores all parts of the device to their normal positions shown in Fig. 18.

It is apparent that the weight 55a, shown in Fig. 2, may be employed, if necessary, to overcome friction and resistance of heavy mud in completing the return or reengaging movement of the clutch, as was stated for the preferred form.

This second modified device, as well as the first modified form, may be employed to make single or successive tests, as explained for the preferred embodiment.

It is understood that all references to positions and directions, such as "upper" and "lower," "upward" and "downward," "above" and "below" apply to the tool as illustrated in the accompanying drawings wherein the upper portion of the tool is shown uppermost.

The invention as herein illustrated and described is manifestly subject to such changes in construction and arrangement of parts as will be within the scope and purpose of the stated objects and appended claims.

What is claimed is:

1. A testing device for wells including in combination, a drill stem, a housing thereon, an expansible packer carried by said housing, a reservoir of liquid also in said housing, and means operable independently of said drill stem to force liquid from said reservoir into said packer to set the packer against the wall of the well bore.

2. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, and additional means also operable by said first means to admit a sample of fluid from the well bore below said packer.

3. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, and clutch means normally holding said drill stem and packer together but adapted to release said drill stem for rotation independent of said packer.

4. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, and clutch means normally holding said drill stem and packer together but adapted to release said drill stem for rotation independent of said packer, said clutch means being operable by said first means.

5. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, additional means also operable by said first means to admit a sample of fluid from the well bore below said packer, and clutch means normally holding said drill stem and packer together but adapted to release said drill stem for rotation independent of said packer.

6. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, and additional means also operable by said first means to admit liquid from the well outside of said drill stem to cooperate with said first means to expand said packer.

7. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, and additional means also operable by said first means to admit liquid above the packer from the well outside of said drill stem to cooperate with said first means to expand said packer.

8. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, and additional means also operable by said first means to admit liquid below the packer from the well outside of said drill stem to cooperate with said first means to expand said packer.

9. A testing device for wells including in combination, a drill stem, a housing thereon, an expansible packer carried by said housing, a reservoir of liquid also in said housing, means operable independently of said drill stem to force liquid from said reservoir into said packer to set the packer against the wall of the well bore, said means comprising a flexible cable operable from the surface through said drill pipe.

10. A formation tester including a housing, an expansible packer thereon, a drill stem connected to said housing, means to release said connection so that said stem may be rotated, and means operable to simultaneously set said packer and release said first means.

11. A well testing tool including a supporting string of drill stem or pipe, a shell surrounding said pipe, a packer on said shell, an upper cylinder secured within said shell, said cylinder having openings proximate the lower end thereof communicating with the well bore, a lower cylinder secured to said shell, means for connecting said cylinders and for separating the chambers thereof, a piston in the upper cylinder, a second piston in the lower cylinder, a third piston below the second piston and secured thereto in said lower cylinder, a pressure pipe surrounding both of said cylinders, said pipe forming an annular space around the cylinders and being connected hermetically at both ends therewith, nipples communicating between said pressure pipe and the packer, a lubricant chamber communicating with the upper cylinder and piston, said chamber having communication with the well bore, a lubricant in said chamber, openings between the upper cylinder and the pressure pipe, said openings being above the upper piston, openings between the lower cylinder and the pressure pipe, said openings being above the second or intermediate piston, a liquid in said upper cylinder above the piston therein and in the pressure pipe surrounding the cylinders, closure means for the upper end of the upper cylinder, a piston rod extending through such closure means, an axial opening through the lower piston and intake ports communicating with an annular space above said piston, said annular space being adapted to become in registration with intake ports in the lower cylinder when the packer is expanded, a spring adapted to normally position the intake ports out of communication with each other, a weight adapted to maintain the pistons in their normal positions, a check valve in the shell below the packer, said valve being adapted to be opened by pressure in the shell above it, an instrument case in the shell, a drill bit upon the lower end of the shell, a pull rod connected with said piston rod, an operating cable and means for releasably engaging the same with said pull rod to lift the upper piston, expand the packer, and open the intake ports, and a drill bit upon the lower end of the shell.

12. A well testing tool including a supporting string of drill stem or pipe, a packer on said pipe, a tubular piston in said pipe, said piston having an upward tubular extension slidable through a sleeve nipple, said extension having openings proximate the upper end thereof, an intake valve nipple extending downward from said piston, a sleeve member over the lower portion of said intake valve nipple, openings in said sleeve, said openings being normally closed by said intake valve nipple and being adapted to be opened by raising the piston, a clutch normally engaged when the packer is unexpanded and adapted to become disengaged when the packer is expanded, a pull rod connected to said piston, said pull rod being attached to means extending through said clutch, said means being attached to a head, an operating cable adapted to be releasably engaged with said head, a chamber above said piston, a nipple surrounding said pipe and forming an annular chamber thereabout, openings communicating between said chambers liquid in said chambers, pressure pipes affording communication between said annular chamber and the inner surface of said packer, a check valve in the pipe below said intake valve nipple, said check valve being adapted to be opened by pressure from above, an instrument case within said pipe below the check valve, and a drill bit upon the lower end of said pipe.

13. A well testing tool including a supporting string of drill stem or pipe, a packer on said pipe, a cylinder secured within said pipe, a piston within said cylinder, tubes communicating between said cylinder and said packer, liquid in said cylinder above the piston, intake openings in said cylinder normally closed by the piston and adapted to be opened when the piston is raised, thereby placing in communication the well bore below the packer and the interior of the pipe, closure means on the upper end of said cylinder, means connecting said piston with a pull rod, a cable operable from above the well, and means on said cable to releasably engage said pull rod, a clutch in said pipe, said clutch being normally engaged and adapted to become disengaged when the piston is raised, a check valve in said pipe below the packer, an instrument case within the pipe below the check valve, and a drill bit upon the lower end of said pipe.

14. A well testing tool including a supporting string of drill stem or pipe, a shell surrounding said pipe, a packer on said shell, an upper cylinder secured within said shell, said cylinder having openings proximate the lower end thereof communicating with the well bore, a lower cylinder secured to said shell, means for connecting said cylinders and for separating the chambers thereof, a piston in the upper cylinder, a second piston in the lower cylinder, a third piston below the second piston in said lower cylinder, a pressure pipe surrounding both of said cylinders, said pipe forming an annular space around the cylinders and being connected hermetically at both ends therewith; communicating means between said pressure pipe and the packer, a lubricant chamber communicating with the upper cylinder and piston, said chamber having communication with the well bore, a lubricant in said chamber, openings between the upper cylinder and the pressure pipe, said openings being above the second or intermediate piston, a liquid in said upper cylinder above the piston therein and in the pressure pipe surrounding the cylinders, closure means for the upper end of the upper cylinder, a rod connected to the piston and extending through said closure means, an axial opening through the lower piston, intake ports communicating with an annular space above said piston, said annular space being adapted to become in registration with intake ports in the lower cylinder when the packer is expanded, and an operating cable and means for releasably engaging the same with a rod extending upward from the upper piston to lift said piston, expand the packer, and open the intake ports.

15. A well testing tool including a supporting string of drill stem or pipe, a packer on said pipe, a tubular piston in said pipe, said piston having an upward tubular extension, said extension having openings in communication with intake ports for well liquid and a check valve, an intake valve nipple extending downward from said piston, a sleeve nipple over the lower portion of said valve nipple, openings in said sleeve, said openings being normally closed by said intake valve nipple and being adapted to be opened by raising the piston, a pull rod connected to said piston, an operating cable adapted to releasably engage said pull rod, a chamber above said piston, a nipple surrounding said pipe and forming an annular chamber thereabout, openings communicating between said chambers, liquid in said chambers, and pressure pipes affording communication between said annular chamber and said packer.

16. A well testing tool including a supporting string of drill stem or pipe, a packer on said pipe, a cylinder secured within said pipe, a piston within said cylinder, means for communication between said cylinder and said packer, liquid in said cylinder above the piston, intake openings in said cylinder normally closed by said piston and adapted to be opened when the piston is raised, thereby placing in communication the well bore below the packer and the interior of the pipe; closure means on the upper end of said cylinder, means connecting said piston with a pull rod, a cable operable from above the well, means on said cable to releasably engage said pull rod, and a check valve in said pipe below the packer.

ALEXANDER BOYNTON.